Nov. 4, 1958  D. K. SCHAEVE  2,859,402
CONDITION RESPONSIVE CONTROL APPARATUS
Filed Dec. 15, 1955
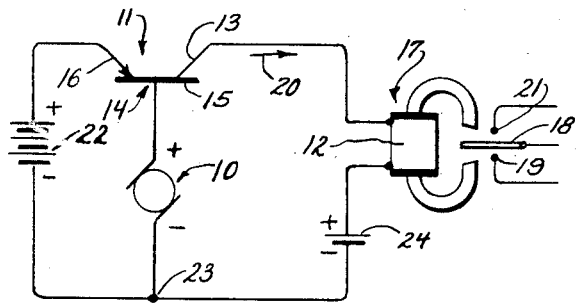
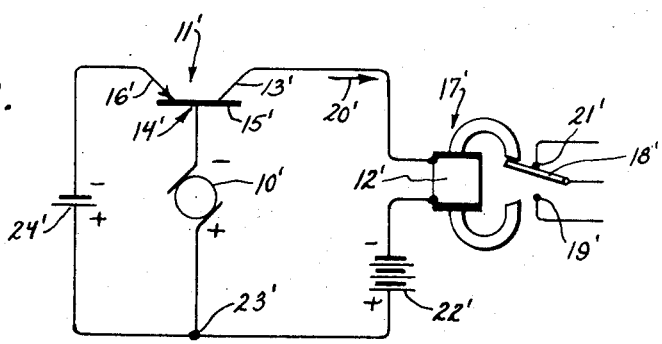
INVENTOR.
Donald K. Schaeve
BY
Carlson, Pitzner, Hubbard & Wolfe
ATTORNEYS

United States Patent Office 2,859,402
Patented Nov. 4, 1958

2,859,402

CONDITION RESPONSIVE CONTROL APPARATUS

Donald K. Schaeve, Rockford, Ill., assignor to Barber-Colman Company, Rockford, Ill., a corporation of Illinois Application December 15, 1955, Serial No. 553,227

13 Claims. (Cl. 323—65)

This invention relates to control apparatus which responds to a signal voltage variable in magnitude in accordance with changes in a condition such as temperature and supplies an output signal suitable for performing a control function, for example, energization of a condition regulator to correct the condition, when the latter deviates from a predetermined control value.

The primary object of the invention is to provide novel condition responsive control apparatus utilizing a transistor to effect one control action when the condition varies a predetermined amount in one direction from the control value and the opposite control action when the condition varies an additional predetermined amount in the same direction.

Another object is to apply the signal voltage to both of the input and output circuits of a transistor amplifier in a novel manner such that deviation of the voltage a predetermined amount in one direction from a control value not only results in a normal or forward output current for effecting one control action, but also, changes the effective supply voltage in the output circuit for blocking such output current to effect the opposite control action in response to further deviation of the signal voltage a predetermined amount in the same direction.

A further object is to insure positive control with apparatus of the above character by establishing forward output current conditions whenever the signal voltage is within a well defined range of values and reverse control current conditions when the signal voltage is beyond one limit of the range.

The invention also resides in the novel manner of defining the limits of the signal voltage range and obtaining reverse output current when the magnitude of the signal voltage is beyond one limit of such range.

Other objects and advantages of the invention will become apparent from the following detailed description taken in connection with the accompanying drawings, in which Figure 1 is a circuit diagram of a condition control system embodying the novel features of the present invention.

Fig. 2 is a circuit diagram of a modified form of the invention.

Fig. 3 is a circuit diagram of another modified form.

Fig. 4 is a circuit diagram of another modification.

The invention is shown in the drawings for purposes of illustration embodied in a system for controlling a condition such as speed, temperature, or position and producing a corrective change in the condition in response to deviation of the same from a desired control value. In this system as shown in Fig. 1, a unidirectional signal voltage derived from a source 10 and variable in magnitude in accordance with changes of the condition is applied to the input circuit of a transistor amplifier 11 to control current flow through a sensing device 12 in the amplifier output circuit. While the source 10 may take various forms depending on the condition being controlled, it is shown herein as a direct current tachometer generator whose rotor is connected to a rotary part such as a motor shaft (not shown) for variation of the amplitude of its output voltage in accordance with changes in the speed of the part. The amplifier output circuit extends between the collector 13 of a transistor 14 in the amplifier and a common one of the base and emitter electrodes 15 and 16, herein the base, the input circuit then extending between the base and the emitter 16. The current sensing device also may take various forms such as an impedance for coupling the amplifier to subsequent amplifier stages, the device shown in this instance as the coil of a direct current polarized relay 17 having a movable contact 18 which engages a first fixed contact 19 when a predetermined current flows through the coil in a normal or forward direction as indicated by an arrow 20. When the current is in the opposite or reverse direction, the movable contact is shifted away from the first contact and into engagement with a second contact 21.

Energization of the relay 17 by forward current flow for closure of the movable and first contacts 18 and 19 may be considered as one control action. Deenergization of the relay or energization thereof by reverse current flow resulting in opening of these contacts then constitutes the opposite control action. The contacts 18 and 19 may be utilized to perform any desired ultimate control function, for example, completion of a control circuit for increasing the speed of the part connected to the rotor of the generator 10 when such speed falls below a desired control value.

As is well known in the transistor art, when the collector of a transistor is biased in a so-called "nonconductive" direction relative to the base, current flows in what may be termed a "normal" direction through the collector in a circuit between the collector and the transistor base in response to current flow in a circuit between the transistor emitter and the base. Such operation of a transistor with collector current varying as a function of emitter current has been called "transistor action." When the collector is biased in the opposite or "conductive" direction relative to the base, the transistor tends to function as a diode with collector current then flowing in the opposite direction and varying as a function of the magnitude of the collector bias substantially independently of the emitter-base current.

When the emitter of a transistor is biased in a "conductive" direction relative to the base, current flows through the emitter as a function of such bias and is substantially independent of collector current flow. When the emitter is biased in the opposite or "nonconductive" direction relative to the base, the emitter current is of a negligibly small value.

Applying the above principles of operation to a specific type of transistor, for example, a p-n-p junction transistor as shown in Fig. 1, the collector 13 is biased "nonconductively" when its polarity is negative relative to the base 15 and the emitter 16 is biased "conductively" when its polarity is positive with respect to the base. With such an inverse polarity relationship of the collector and the emitter relative to the base, collector current varies as a function of emitter current and flows in its normal direction which is away from the collector as shown by the arrow 20 in Fig. 1, the normal direction of the emitter current flow being toward the emitter from the base. The resulting transistor action, that is, variation of normal collector current as a function of emitter current, is substantially independent of variations of collector bias voltage through a wide range of values of this voltage, for example, from approximately 2 to 25 volts in some transistors. As is well known in the art, junction type transistors are characterized further by current gains less than unity so that they provide stable or linear amplification.

If the polarity of the emitter bias of the transistor 14 of Fig. 1 is changed so as to be negative or nonconductive relative to the base 15 while the collector bias remains negative, the emitter current then becomes substantially zero or of a negligibly small value in a direction reverse to normal emitter current and the collector current is correspondingly reduced. Should the polarity of the collector bias be made positive, a collector current flows in the reverse direction or toward the collector from the base and varies as a function of the collector bias. The operation of an n-p-n transistor is similar except that the polarities and directions of current flow are reversed.

In accordance with the present invention, advantage is taken of the peculiar characteristics of transistors noted above, namely, the inverse polarity relation of the emitter and collector biases required for transistor action and the wide range of collector bias voltages permitting such action, to supply a forward control current in the output circuit of the amplifier 11 (Fig. 1) for effecting one control action when the condition responsive voltage of the source 10 is within a predetermined range of values and to block such output current when the value of the condition responsive voltage is outside of such range. For this purpose, the condition responsive voltage is utilized to control the bias voltage in both the input and output circuits of the amplifier by connecting the source 10 in each circuit. The polarity of the condition responsive voltage in one of these circuits is in a direction to aid transistor action and, in the other circuit, is in a direction to oppose transistor action. To define the high limit of the forward current range and block forward control current when the condition responsive voltage exceeds this high limit, a reference voltage of a source such as a battery 22 is applied in series with and in opposition to the condition responsive voltage in the circuit in which the latter is polarized to oppose transistor action. With this arrangement, a change of the condition responsive voltage as applied to the amplifier input circuit in a direction to increase the forward amplifier output current also reduces the effective bias on the collector in a nonconductive direction. Thus, continued change of the condition responsive voltage in the same direction to a magnitude exceeding the high limit defined by the source 22 eventually reduces the nonconductive collector bias to a low value insufficient to support transistor action.

Where it is desired to establish forward output current conditions for pull-in of the relay 17 in response to a decrease in the condition responsive voltage to a predetermined value and to deenergize the relay in response to a further decrease, the reference voltage is applied to the amplifier input electrode, the emitter 16 in Fig. 1, to bias the same in a conductive direction, that is, positively with respect to the base 15. The condition responsive voltage then is applied in the input circuit in opposition to the reference voltage and biases the emitter in the nonconductive direction or negatively relative to the base so as to oppose the transistor action. In the output circuit, the condition responsive voltage biases the collector 13 negatively relative to the base 15 or in the nonconductive direction so as to aid transistor action. Application of the condition responsive and reference voltages in the foregoing manner is effected in this instance by connecting the reference battery 22 in series with the emitter 16 and the condition responsive source 10 in series with the base 15, the negative terminals of battery and the source as indicated by the minus signs in Fig. 1 being connected to a common junction 23 of the input and output circuits.

Means also is provided to define the low limit of the forward current range of condition responsive voltage values and to block forward control current flow when the magnitude of the condition responsive voltage is less than the low limit. In the system shown in Fig. 1, this means comprises a battery 24 connected in series with the relay coil 12 between the collector 13 and the common junction 23 and providing a second reference voltage of a polarity to oppose both the condition responsive voltage and transistor action, the battery herein biasing the collector conductively.

In the operation of the system of Fig. 1, let it be assumed that the magnitude of the condition responsive voltage is greater than that of the high limit battery 22. The bias on the collector 13 then will be in the nonconductive direction and of a sufficient amount to support transistor action. The bias on the emitter 16, however, being equal to the algebraic sum of the condition responsive and high limit reference voltages, is in a nonconductive direction so that transistor action is blocked and insufficient current flows in the forward direction to energize the relay 17 for closure of the contacts 18 and 19. As the condition responsive voltage decreases in magnitude below the high limit reference voltage, the emitter is biased conductively for normal emitter current flow and collector current flows in the normal direction as indicated by the arrow 20 in Fig. 1. When the difference between the high reference and condition responsive voltages is large enough to produce the desired collector current flow for energizing the relay 17, the latter pulls in to close its contacts 18 and 19. Further decrease of the condition responsive voltage results in an increase of normal emitter current but a decrease in the nonconductive bias on the collector. When this bias which is the algebraic sum of the condition responsive voltage and the low limit reference voltage of the battery reaches a low value insufficient to support transistor action as determined by the characteristics of the particular transistor used, the normal collector current is insufficient to maintain the relay energized and the relay drops out. Upon further decrease of the condition responsive voltage below the voltage of the battery 24, the collector 13 is biased conductively and a small reverse current flows through the relay coil 12 to insure that the contacts 18 and 19 remain open.

Where it is desired to produce one control action in response to increase of the condition responsive voltage and an opposite control action in response to further increase in the voltage, the latter and the reference voltage may be applied to the transistor electrodes in the manner shown in Fig. 2 in which elements corresponding to those of Fig. 1 bear similar but primed reference characters. Like that of Fig. 1, the system of Fig. 2 includes a transistor 14' of the p-n-p junction type with the condition responsive source 10' connected in series with the base 15' between the latter and the common junction 23' of the input and output circuits. However, the positive terminal of this source is connected to the junction so that the condition responsive voltage aids transistor action in the input circuit of the transistor by biasing the emitter 16' positively or in the conductive direction and opposes such action in the output circuit by biasing the collector 13' positively or in the conductive direction. The relay 17' is connected in series with the collector 13' for energization by normal collector current flow as indicated by the arrow 20'.

To set the high limit of the condition responsive voltage range in which the relay is energized, the high limit battery 22' is connected in series with the relay in the output circuit to aid transistor action by applying a nonconductive bias to the collector. The low limit battery 24' is connected in series with the emitter 16' and is polarized to bias the latter negatively and thereby oppose transistor action.

Assuming the voltage of the condition responsive source 10' to be lower than that of the low limit battery 24', the emitter 16' is biased negatively to block transistor action and the relay 17' remains deenergized with the contacts 18' and 19' open even though the collector is biased nonconductively by the high limit battery 22'. As the condition responsive voltage increases to a value greater than that of the low limit battery 24' but less than that of the high limit battery 22', emitter current flows and a corresponding collector current flows in the normal direction to energize the relay 17' to close the contacts 18' and 19'. Such increase of condition responsive voltage is accompanied by a decrease in the effective nonconductive bias on the collector so that, when the condition responsive voltage exceeds that of the high limit battery 22', the collector 13' is biased conductively and the relay contacts 18' and 19' are held in open condition by a reverse current flow through the collector and the relay coil 12'.

The novel manner of controlling the potentials in both the input and output circuits of a transistor amplifier to produce a desired control action only when the condition responsive voltage is within a predetermined range of values also may be utilized in an amplifier having two transistors arranged to obtain a larger power output than is available from a single transistor and to compensate for variations of transistor operating characteristics such as may occur during ambient temperature changes. In an amplifier of this type shown in Fig. 3, the transistors 25 and 26 are both of the n-p-n junction type with their emitters 27 and 28 connected together at a junction 29. The output signal of the amplifier appears across two impedance elements 30 and 31 which are connected in series between the collectors 32 and 33 of the transistors.

In this instance, the output impedance elements 30 and 31 of the amplifier of Fig. 3 are coils of a differential relay 34 having a movable contact 35 shiftable against a fixed contact 36 when the collector current of the first transistor 25 through the first relay coil 30 in the normal direction indicated by an arrow 37 in Fig. 3 exceeds the normal collector current of the second transistor 26 through the second relay coil 31 in the direction indicated by an arrow 38. This current condition corresponds to the normal or forward output current condition referred to in connection with Fig. 1 and is contrasted with a reverse current condition which effects shifting of the movable relay contact 35 against a second fixed contact 39 and which exists when either the normal current in the second relay coil 31 exceeds that of the first coil 30 or current flow in the latter is in the reverse direction opposite that indicated by the arrow 37.

The condition responsive voltage is derived from a condition sensing element in the form of a temperature responsive resistor 40 connected as one leg of a bridge 41 having one input terminal 42 connected to a negative terminal of a supply battery 43 through ground and its other input terminal 44 connected to the positive terminal of the battery through a resistor 45. To utilize the condition responsive voltage drop across the sensing resistor 40 to control the bias on the collector 32 of the first transistor 25, the input terminal 44 of the bridge 41 at one end of this resistor is connected by a conductor 46 to the common junction 47 of the relay coils 30 and 31 and one output terminal 48 of the bridge at the other end of the sensing resistor is connected by a conductor 49 to the base 50 of the first transistor. The condition responsive voltage then biases the first collector 32 nonconductively.

To define the high limit of the range of condition responsive voltages resulting in forward output current conditions, a first fixed resistor 51 constituting a second arm of the bridge 41 and connected in series with the sensing resistor 40 between the bridge output terminals 48 and 52 supplies a reference voltage which is applied in opposition to the condition responsive voltage in the input circuits of the two transistors. Such application is effected through the medium of a voltage divider formed by second and third fixed bridge resistors 53 and 54 connected between the grounded bridge input terminal 41 and the respective output terminals 48 and 52. Through the conductor 49 between the base 50 of the first transistor 25 and one bridge output terminal 48, a conductor 55 between the other output terminal 52 and the base 56 of the second transistor 26, and a conductor 57 with a series bias resistor 58 between the grounded input terminal 42 and the common emitter junction 29, the voltage drops across the second and third fixed resistors 53 and 54 bias the respective emitters 27 and 28 of the two transistors. Through the conductors 46 and 55, the voltage drop across the first fixed resistor 51 biases the collector 33 of the second transistor nonconductively relative to the base 56.

With the system of Fig. 3 described thus far, balance of the bridge 41 results in substantially equal current flow in opposite directions in the relay coils 30 and 31 so that the relay is in a neutral or balanced condition. As the resistance of the sensing element 40 decreases with a decrease of its ambient temperature, the potential of the first output terminal 48 of the bridge and therefore of the first transistor base 50 relative to ground increases to increase current flow in the emitter 27 of the first transistor. Since the collector 32 of the first transistor is biased nonconductively by the sensing resistor voltage, the increased emitter current results in an increase of normal current in the collector 32 and its series connected relay coil 30 in the direction of the arrow 37. Also, the drop across the series emitter resistor 58 is increased so as to decrease the conductive bias on the emitter 28 of the second transistor 26 and decrease emitter current flow with a corresponding decrease of normal current in the collector 33 of the second transistor and its series relay coil 31 in the direction of the arrow 38 in opposition to the current of the first relay coil 30. The forward control current condition then exists and, when the current differential increases to the pull-in value of the relay, the movable contact 35 is shifted into engagement with the first fixed contact 36 to complete a suitable external control circuit (not shown).

Should the resistance of the sensing element 40 increase above its balance value so that its condition responsive voltage drop exceeds the opposing reference voltage across the first fixed resistor 51, the first collector 32 still is biased conconductively by the condition responsive voltage, but the potential of the first output terminal 48 of the bridge 41 and therefore of the first transistor base 50 relative to ground decreases so as to reduce the conductive bias on the first emitter and current flow in the latter with a corresponding decrease of collector current in the first relay coil 30. With a decrease of current in the first emitter 27, the drop across the common emitter resistor 58 decreases with a corresponding increase in the conductive bias on the emitter 28 of the second transistor 26 to increase normal current flow in the second collector 33 and the second relay coil 31. The current in the latter then exceeds that of the first coil 30 to establish reverse output current conditions and, when the differential is large enough, the movable contact 35 shifts against the second fixed contact 39 to insure interruption of the external control circuit through the first fixed contact 36.

When an open circuit develops at the sensing resistor 40 so that the voltage drop across the same is reduced to zero, the first collector 32 is biased nonconductively relative to the first base 50 due to the drop across the first and third fixed bridge resistors 51 and 54, and since no current flows through the second resistor 53, the first emitter 27 is biased nonconductively by the voltage drop across the common emitter resistor 58. As a result, transistor action in the first transistor is blocked. Such action takes place in the second transistor 26, however, since the collector 33 of the latter is biased nonconductively by the drop across the first fixed resistor 51 and its emitter is biased conductively by the drop across the third resistor 54. Current flow in the second relay coil 31 in the normal direction then exceeeds that of the first coil 30 thereby establishing the reverse control current condition to maintain the movable contact 35 out of engagement with the first fixed contact 36.

In the event that a short circuit develops across the sensing resistor 40, the conductive bias on the emitter 27 of the first transistor 25 will be increased to increase the emitter current flow over its balance value, but the nonconductive bias applied to the collector 32 by the sensing resistor is reduced to zero. While this tends to block transistor action, the first collector 32 may be biased nonconductively by a small internal voltage drop of the base resistance and emitter current resulting in a very small current flow in the collector and its relay coil 30 in the normal direction. Due to the increased current flow in the first emitter 27, the voltage drop of the common emitter resistor 58 biasing the second emitter 28 in a nonconductive direction also is increased to block transistor action in the second transistor with current flow in the second relay coil 31 thereby reduced substantially to zero. Thus, when the sensing element is short circuited, the output current, although close to its balance condition, may actually be in its forward condition to a small degree.

To hold the movable contact 35 of the relay 34 away from the fixed contact 36 and thereby insure positive control action and safe conditions when the sensing resistor 40 is short circuited, means corresponding to the low limit reference battery 24 of Fig. 1 is provided in the system of Fig. 3 to establish reverse control current conditions. In one form of this means which is utilized to apply a low limit reference voltage to the collector 32 of the first transistor 25 in opposition to the condition responsive voltage, the reference voltage is derived from the supply battery 43 through the medium of a voltage divider. The latter comprises the resistor 45 in series with the battery, a second resistor 60 connected in series with the conductor 46 between the common coil junction 47 and the positive input terminal 44 of the bridge 41, and a third resistor 61 connected between the common coil junction and the negative bridge input terminal through ground. The low limit reference voltage then appears across the second divider resistor 60 and biases the collector 32 of the first transistor 25 conductively to provide a reverse collector current flow which establishes a reverse control current condition in the relay coils 30 and 31 when the condition responsive voltage is lower in magnitude than the reference voltage and the current in the collector 33 of the second transistor 26 is reduced substantially to zero.

In another form shown in Fig. 4, the means for establishing reverse control conditions in the relay coils 30 and 31 upon short circuiting of the sensing resistor 40 comprises a fail safe resistor 62 which completes a series circuit through the second relay coil 31 and the battery 43 to provide normal current flow in the coil away from the common junction 47 regardless of the value of the condition responsive voltage and the conductive condition of the second transistor. Herein, one terminal of this resistor is connected to the junction between the second coil 31 and the second collector 33 and its other terminal is connected to the negative terminal of the battery through ground. With the fail safe resistor 62 to establish reverse control current conditions even though substantially no current is flowing the collector of either of the transistors, the second divider resistor 60 and the connection between the common coil junction 47 and ground through the third divider resistor 61 are omitted so that the common coil junction 47 is connected only to the positive input terminal 44 of the bridge through only the conductor 46. In other respects, the control of Fig. 4 is the same as that of Fig. 3.

In each of the control systems described above, an output current condition is established for producing a desired control action such as pull-in of a relay when the value of the condition responsive voltage is within a predetermined range. The high limit of this range is defined by a reference voltage applied in opposition to the condition responsive voltage. The value of condition responsive voltage at the low limit of the range is defined by the value of the low limit reference voltage applied in opposition to the condition responsive voltage as in Figs. 1, 2 and 3 or is equal to the voltage required to produce normal current flow in the first relay coil 30 in an amount sufficient to overcome the continuous opposing current in the normal direction through the second relay coil 31 and the fail safe resistor 62 shown in Fig. 4. The specific values of the high and low limits may be established as desired by proper selection of the reference voltages or the fail safe resistor. Such selection includes consideration of the characteristics of the particular transistors employed and the voltages developed internally of the transistors so that the values chosen may vary with different transistors. In one control system arranged shown in Fig. 4 with the fail safe resistor 62 and without the reference voltage resistors 60 and 61, typical values for the circuit elements were as follows where the transistors 25 and 26 were type 201 Germanium n-p-n transistors sold by Texas Instruments Company: 26 volts for the supply battery 43, 400 ohms for the series supply resistor 45, approximately 400 ohms for each of the fixed bridge resistors 51, 53 and 54 and the sensing resistor 40, 4700 ohms for the common bias resistor 58, 4700 ohms for each of the relay coils 30 and 31, and 100,000 ohms for the fail safe resistor 62.

I claim as my invention:

1. Condition responsive control apparatus having, in combination, a bridge having input and output terminals and two arms of fixed impedance connected between one input terminal and the respective output terminals, a source of unidirectional voltage connected across said input terminals, one arm of said bridge between the other input terminal and a first output terminal having an impedance variable in accordance with changes in a condition to provide a condition responsive voltage and another arm between the other input terminal and the second output terminal having a fixed impedance to provide a reference voltage, first and second transistors having base electrodes connected to the respective output terminals of said bridge and emitter electrodes connected to each other and through a common resistor to said one input terminal whereby said two arms of fixed resistance constitute a voltage divider for applying the difference between said reference and condition responsive voltages to input circuits of the transistors, each of said transistors having a collector electrode, two load impedance elements connected in series between said collector electrodes and having a common junction, a conductor connecting said common junction to said other bridge input terminal to complete an output circuit for each of said transistors through the associated one of said load elements and to apply said condition responsive voltage directly into the output circuit of said first transistor, said transistors cooperating to establish forward current conditions in said load elements when said condition responsive voltage is less than said reference voltage and above a predetermined low value, and means applying a second reference voltage in said output circuit of said first transistor in opposition to said condition responsive voltage to define said predetermined low value and establish reverse load current conditions when the condition responsive voltage is below such low value.

2. Condition responsive control apparatus having, in combination, a bridge having input and output terminals and two arms of fixed impedance connected between one input terminal and the respective output terminals, a source of unidirectional voltage connected across said input terminals, one arm of said bridge between the other input terminal and a first output terminal having an impedance variable in accordance with changes in a condition to provide a condition responsive voltage and another arm between the other input terminal and the second output terminal having a fixed impedance to provide a reference voltage, first and second transistors having base electrodes connected to the respective output terminals of said bridge and emitter electrodes connected to each other and through a common resistor to said one input terminal whereby said two arms of fixed resistance constitute a voltage divider for applying the difference between said reference and condition responsive voltages to input circuits of the transistors, each of said transistors having a collector electrode, two load impedance elements connected in series between said collector electrodes and having a common junction, a conductor connecting said common junction to said other bridge input terminal to complete an output circuit for each of said transistors through the associated one of said load elements and to apply said condition responsive voltage directly into the output circuit of said first transistor, said transistors cooperating to establish forward current conditions in said load elements when said condition responsive voltage is less than said reference voltage and above a predetermined low value, and means defining said low value of condition responsive voltage and comprising a voltage divider completing a circuit through said load impedance of said second transistor for establishing reverse load current conditions when the condition responsive voltage is below the predetermined low value.

3. Condition responsive control apparatus having, in combination, a bridge having input and output terminals and two arms of fixed impedance connected between one input terminal and the respective output terminals, a source of unidirectional voltage connected across said input terminals, one arm of said bridge between the other input terminal and a first output terminal having an impedance variable in accordance with changes in a condition to provide a condition responsive voltage and another arm between the other input terminal and the second output terminal having a fixed impedance to provide a reference voltage, first and second transistors having base electrodes connected to the respective output terminals of said bridge and emitter electrodes connected to each other and through a common resistor to said one input terminal whereby said two arms of fixed resistance constitute a voltage divider for applying the difference between said reference and condition responsive voltages to input circuits of the transistors, each of said transistors having a collector electrode, two load impedance elements connected in series between said collector electrodes and having a common junction, a conductor connecting said common junction to said other bridge input terminal to complete an output circuit for each of said transistors through the associated one of said load elements and to apply said condition responsive voltage directly into the output circuit of said first transistor, said transistors cooperating to establish forward current conditions in said load elements when said condition responsive voltage is less than said reference voltage and above a predetermined low value, and means defining said low value of condition responsive voltage and operable to establish reverse load current conditions when the condition responsive voltage is below the predetermined low value.

4. Condition responsive control apparatus having, in combination, a bridge having input and output terminals and two arms of fixed impedance connected between one input terminal and the respective output terminals, a source of unidirectional voltage connected across said input terminals, one arm of said bridge between the other input terminal and a first output terminal having an impedance variable in accordance with changes in a condition to provide a condition responsive voltage and another arm between the other input terminal and the second output terminal having a fixed impedance to provide a reference voltage, first and second transistors having corresponding base electrodes connected to the respective output terminals of said bridge and emitter electrodes connected to each other and through a common resistor to said one input terminal whereby said two arms of fixed resistance constitute a voltage divider for applying the difference between said reference and condition responsive voltages to input circuits of the transistors, each of said transistors having a collector electrode, two load impedance elements connected in series between said collector electrodes and having a common junction, and a conductor connecting said common junction to said other bridge input terminal to complete an output circuit for each of said transistors through the associated one of said load elements and to apply said condition responsive voltage directly into the output circuit of said first transistor, said transistors cooperating to establish forward current conditions in said load elements when said condition responsive voltage is less than said reference voltage and above a low value insufficient to support transistor action in said first transistor.

5. Condition responsive control apparatus having, in combination, a transistor having an input circuit connected between an emitter electrode and a base electrode and an output circuit connected between the base electrode and a collector electrode, means providing a condition responsive voltage of variable magnitude and connected to both of said circuits for biasing each of said emitter and collector electrodes in a non-conducting direction, reference means connected to said input circuit for applying a reference voltage in series with said condition responsive voltage in a direction to oppose the latter and to bias said emitter electrode in a conducting direction, and a device connected in said output circuit for sensing current flow therein when the magnitude of said condition responsive voltage is less than that of said reference voltage, said condition responsive voltage providing the output circuit supply voltage whereby current flow in said output circuit in response to current flow in the said input circuit is blocked when the condition responsive voltage decreases to a low value insufficient to support transistor action.

6. Condition responsive control apparatus having, in combination, a transistor having an input circuit connected between an emitter electrode and a base electrode and an output circuit connected between the base electrode and a collector electrode, a device in said output circuit for sensing current flow therein when said collector electrode is biased in a nonconducting direction and current is flowing in said input circuit, a condition sensing element adapted to provide a voltage of variable magnitude, means providing a source of reference voltage of fixed magnitude, means applying said variable voltage and said reference voltage to said input circuit in opposition to each other to vary the current flow in the input circuit inversely in accordance with changes in the variable voltage, and means connecting said sensing element into said output circuit for biasing said collector electrode in said nonconducting direction, said transistor blocking said output current when the nonconductive bias on said collector electrode is removed by reduction of said variable voltage upon open circuiting and short circuiting of said sensing element.

7. Condition responsive control apparatus having, in combination, a stable transistor amplifier comprising a junction type transistor and having an input circuit connected between an emitter electrode and a base electrode and an output circuit connected between the base electrode and a collector electrode of the transistor, means providing a condition responsive voltage of variable magnitude and connected to both of said circuits for biasing each of said collector and emitter electrodes in a conductive direction, reference means connected to said output circuit for applying a reference voltage in series with said condition responsive voltage in a direction to oppose the latter and bias said collector electrode in a nonconductive direction, and a device connected in said output circuit for sensing current flow therein when current flows in said input circuit and when the magnitude of said reference voltage is greater than that of said condition responsive voltage to bias said collector electrode in a nonconducting direction.

8. Condition responsive control apparatus having in combination, means providing a unidirectional condition responsive voltage of variable magnitude, a stable transistor amplifier comprising a junction type transistor and having input and output circuits each connected to said condition responsive means for application of said voltage thereof in one of the circuits to aid current flow in the output circuit in response to changes of current in the input circuit and in the other circuit to oppose such output current flow, first reference means connected into said one circuit to apply a first reference voltage of predetermined value in the circuit in a direction to oppose said condition responsive voltage and said output current flow, second reference means connected into said other circuit to apply a second reference voltage of predetermined value in the circuit in a direction to oppose said condition responsive voltage and aid said output current flow, and a device in said output circuit for sensing said current flow therein, said first and second reference voltages respectively defining low and high limits of a predetermined range of magnitudes of said condition responsive voltage for producing said output current flow when the magnitude of the condition responsive voltage is within the range and for blocking the output current flow when the magnitude of the condition responsive voltage is above and below the range.

9. Condition responsive control apparatus having, in combination, a condition sensing element adapted to provide a condition responsive voltage of variable magnitude, a stable transistor amplifier comprising a junction type transistor and having an input circuit and an output circuit each including said sensing element for application of said condition responsive voltage in one circuit in a direction to aid current flow in a forward direction in the output circuit in response to input circuit current flow and in the other circuit in a direction to oppose such output current flow, means connected in said other circuit and applying thereto a reference voltage opposing said condition responsive voltage in the circuit, said condition responsive voltage cooperating with said reference voltage to produce said forward output current flow when the condition responsive voltage is within a predetermined range of values less than the reference voltage and to block said output current flow when the condition responsive voltage exceeds the reference voltage, a device in said output circuit for sensing said forward output current flow, and means defining the low limit of said range for blocking said output current flow when the condition responsive voltage is less than such low limit as occurs upon short circuiting and open circuiting of said sensing element.

10. Condition responsive control apparatus having, in combination, a condition sensing element adapted to provide a condition responsive voltage of variable magnitude, a stable transistor amplifier comprising a junction type transistor and having an input circuit and an output circuit each including said sensing element for application of said condition responsive voltage in one circuit in a direction to aid current flow in the output circuit in response to input circuit current flow and in the other circuit in a direction to oppose such output current flow, means connected in said other circuit and applying thereto a reference voltage opposing said condition responsive voltage in the circuit, said condition responsive voltage cooperating said reference voltage to produce said output current flow when the condition responsive voltage is within a predetermined range of values less than the reference voltage and to block said output current flow when the condition responsive voltage exceeds the reference voltage, and a device in said output circuit for sensing said output current flow, said transistor blocking said output current when the condition responsive voltage reaches a predetermined low value insufficient to support transistor action upon short circuiting and open circuiting of said sensing element.

11. Condition responsive control apparatus having, in combination, means providing a condition responsive unidirectional voltage of variable magnitude, a stable transistor amplifier comprising a junction type transistor and having input and output circuits each connected to said condition responsive means for application of said voltage thereof in one circuit in a direction to air transistor action and in the other circuit in a direction to oppose transistor action, means connected in one of said circuits and applying thereto a reference voltage opposing said condition responsive voltage in the circuit, a device in said output circuit for sensing a predetermined current therein resulting from transistor action, said reference and condition responsive voltages having values correlated with each other to produce transistor action and cause said predetermined current to flow when the condition responsive voltage is within a predetermined range of values less than said reference voltage and to limit current flow in said output circuit to a value less than that of the predetermined current when the condition responsive voltage exceeds the reference voltage in magnitude.

12. Condition responsive control apparatus having, in combination, a stable transistor amplifier comprising a junction type transistor and having an input circuit and an output circuit, means included in one of said circuits for impressing thereon a unidirectional reference voltage in a direction to produce an output current flow in said output circuit in response to current flow in said input circuit, means connected into both of said circuits and providing a condition responsive unidirectional voltage which varies in magnitude in accordance with changes in a condition and is applied to said one circuit in a direction to oppose said reference voltage and in the other of said circuits in a direction to produce said output current flow in response to said current flow in said input circuit, and a device in said output circuit for sensing said output current flow therein, said reference voltage and said condition responsive voltage having values correlated with each other for producing said output current flow when the magnitude of the condition responsive voltage is within a predetermined range of values smaller than the reference voltage and to block such current flow when the magnitude of the condition responsive voltage exceeds that of the reference voltage.

13. Condition responsive control apparatus having in combination, a stable transistor amplifier comprising a junction type transistor and having an input circuit including an emitter electrode and an output circuit including a collector electrode of the transistor, a device in said output circuit for sensing current flow therein when said emitter electrode is biased in a conducting direction and said collector electrode is biased in a nonconducting direction, means providing a condition responsive voltage of variable magnitude, means providing a reference voltage of predetermined magnitude, and means applying said condition responsive voltage to each of said circuits and said reference voltage to one of the circuits to produce said output current flow when the magnitude of the condition responsive voltage is within a predetermined range of values less than said reference voltage magnitude and to block such current flow when the condition responsive voltage exceeds the reference voltage.

References Cited in the file of this patent

UNITED STATES PATENTS

| | | |
|---|---|---|
| 2,579,336 | Rack | Dec. 18, 1951 |
| 2,622,213 | Harris | Dec. 16, 1952 |
| 2,657,683 | Koller | Nov. 3, 1953 |
| 2,680,160 | Yaeger | June 1, 1954 |
| 2,708,720 | Anderson | May 17, 1955 |
| 2,718,613 | Harris | Sept. 20, 1955 |